(12) United States Patent
    Stagg et al.

(10) Patent No.: US 10,563,708 B2
(45) Date of Patent: Feb. 18, 2020

(54) VISCOUS FLUID SHEAR DEVICE HAVING FLUID CHANNEL(S) FORMED IN FLOATING WIPER

(71) Applicant: BorgWarner Inc., Auburn Hills, MI (US)

(72) Inventors: Jonathan B. Stagg, Bellevue, MI (US); Samuel E. Settineri, Marshall, MI (US)

(73) Assignee: BORGWARNER INC., Auburn Hills, MI (US)

( * ) Notice: Subject to any disclaimer, the term of this patent is extended or adjusted under 35 U.S.C. 154(b) by 382 days.

(21) Appl. No.: 15/481,930

(22) Filed: Apr. 7, 2017

(65) Prior Publication Data
    US 2018/0291969 A1    Oct. 11, 2018

(51) Int. Cl.
    *F16D 35/02*    (2006.01)
(52) U.S. Cl.
    CPC ........... *F16D 35/02* (2013.01); *F16D 35/021* (2013.01)
(58) Field of Classification Search
    CPC ....... F16D 35/02; F16D 35/021; F16D 35/024
    USPC ....................................................... 192/58.7
    See application file for complete search history.

(56) References Cited

U.S. PATENT DOCUMENTS

| 4,086,989 A | * | 5/1978 | Spence ................. F16D 35/021 |
| | | | 192/58.7 |
| 4,592,456 A | * | 6/1986 | Neugebauer .......... F16D 35/022 |
| | | | 192/58.681 |
| 6,050,229 A | | 4/2000 | Inoue |
| 6,530,748 B2 | | 3/2003 | Light et al. |
| 7,650,974 B2 | | 1/2010 | Light et al. |
| 7,963,380 B2 | | 6/2011 | Light et al. |
| 9,470,278 B1 | | 10/2016 | Stagg et al. |
| 9,618,059 B2 | | 4/2017 | Schmidt et al. |
| 2004/0124057 A1 | | 7/2004 | Shiozaki et al. |
| 2016/0123410 A1 | | 5/2016 | Light et al. |

* cited by examiner

*Primary Examiner* — Richard M Lorence
(74) *Attorney, Agent, or Firm* — Harness, Dickey & Pierce, P.L.C.

(57) ABSTRACT

A viscous fluid shear device that includes a floating wiper. The wiper defines at least one fluid channel on a surface of the wiper that faces a circumferentially extending surface on a rotor. Each fluid channel has a first portion, which is formed with a first cross-sectional area, and a second portion that is formed with a second, smaller cross-sectional area. Each of the first and second cross-sectional areas is defined by first and second planes, respectively, that extend through the central axis. The second plane is spaced circumferentially apart from the first plane in the predetermined rotational direction.

25 Claims, 9 Drawing Sheets

VISCOUS FLUID SHEAR DEVICE HAVING FLUID CHANNEL(S) FORMED IN FLOATING WIPER

FIELD

The present disclosure relates to a viscous fluid shear device having one or more fluid channels formed in a floating wiper.

BACKGROUND

This section provides background information related to the present disclosure which is not necessarily prior art.

U.S. Pat. No. 7,650,974 discloses a viscous clutch having a housing, a rotor or clutch disk that is rotatably disposed in the housing assembly, and a wiper that is configured to scrape or wipe a viscous fluid off an outer circumferential surface of the rotor and direct the scraped/wiped fluid to a scavenge passage formed in the housing assembly. The wiper is movably (e.g., pivotably) mounted to the housing assembly and rests on the outside circumferential surface of the rotor. This configuration was a quantum leap in viscous clutch technology because it obtained a relatively high degree of sealing between the wiper, the circumferential surface of the rotor and the housing assembly while subjecting the wiper to relatively modest amounts of wear through the life of the viscous clutch.

While the above-described viscous clutch is well suited for its intended use, it would be desirable to further improve the wear-resistance of the viscous clutch so as to increase the useful life of the viscous clutch.

SUMMARY

This section provides a general summary of the disclosure, and is not a comprehensive disclosure of its full scope or all of its features.

In one form, the present disclosure provides a viscous fluid shear device that includes a housing assembly, a rotor, a reservoir and a wiper. The housing assembly has a plurality of first ribs, which are disposed concentrically about a central axis, and a scavenge conduit. The rotor is received in the housing assembly and is rotatable relative to the housing assembly about the central axis in a predetermined rotational direction. The rotor defines a plurality of second ribs. The rotor cooperates with the housing assembly to define a working cavity in which the first and second ribs are received. The wiper is movably mounted to the housing assembly and is configured to direct a viscous fluid from a circumferentially extending surface on the rotor. The scavenge conduit fluidly couples the working cavity to the reservoir. The wiper defines at least one fluid channel on a surface of the wiper that faces the circumferentially extending surface on the rotor. Each fluid channel has a first portion, which is formed with a first cross-sectional area, and a second portion that is formed with a second, smaller cross-sectional area. Each of the first and second cross-sectional areas being defined by first and second planes, respectively, that extend through the central axis, the second plane being spaced circumferentially apart from the first plane in the predetermined rotational direction.

In another form, the present disclosure provides a viscous fluid shear device with a housing assembly, a rotor, a reservoir and a wiper. The housing assembly has a plurality of first ribs, which are disposed concentrically about a central axis, and a scavenge conduit. The rotor is received in the housing assembly and is rotatable relative to the housing assembly about the central axis in a predetermined rotational direction. The rotor defines a plurality of second ribs. The rotor cooperates with the housing assembly to define a working cavity in which the first and second ribs are received. The wiper is movably mounted to the housing assembly and is configured to direct a viscous fluid from a circumferentially extending surface on the rotor. The scavenge conduit fluidly couples the working cavity to the reservoir. The wiper defines at least one fluid channel on a surface of the wiper that faces the circumferentially extending surface on the rotor. Each fluid channel has a first portion, which is configured with a maximum depth as measured from the surface of the wiper that faces the circumferentially extending surface of the rotor. At one or more locations, a depth of the second portion as measured from the surface of the wiper that faces the circumferentially extending surface of the rotor is smaller than the maximum depth of the first portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
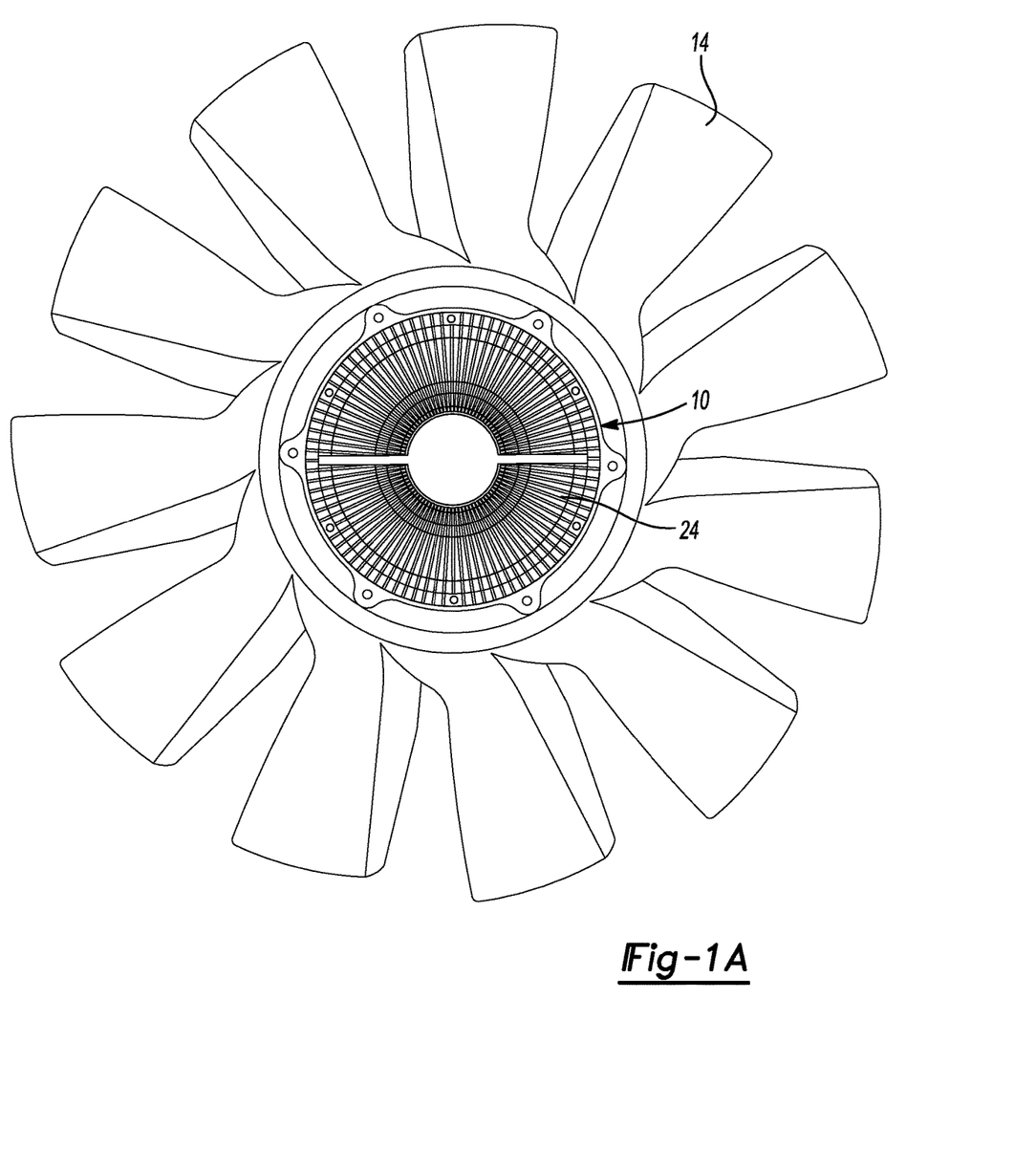
FIG. 1A is a front elevation view of an exemplary viscous fluid shear device constructed in accordance with the teachings of the present disclosure, the viscous fluid shear device being shown in operative association with an axial flow fan.
Figure 1B:
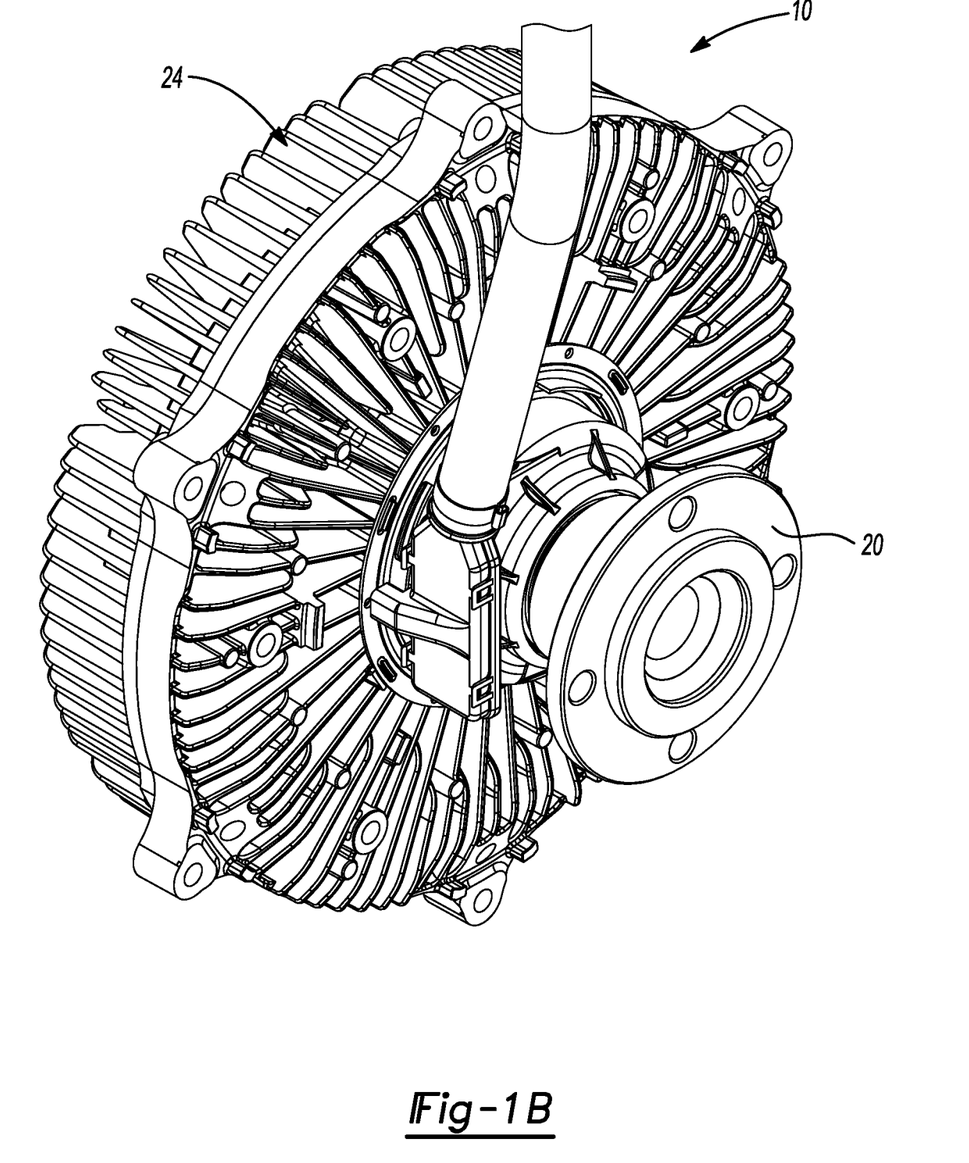
FIG. 1B is a perspective view of the rear of the viscous fluid shear device of FIG. 1A.
Figure 2:
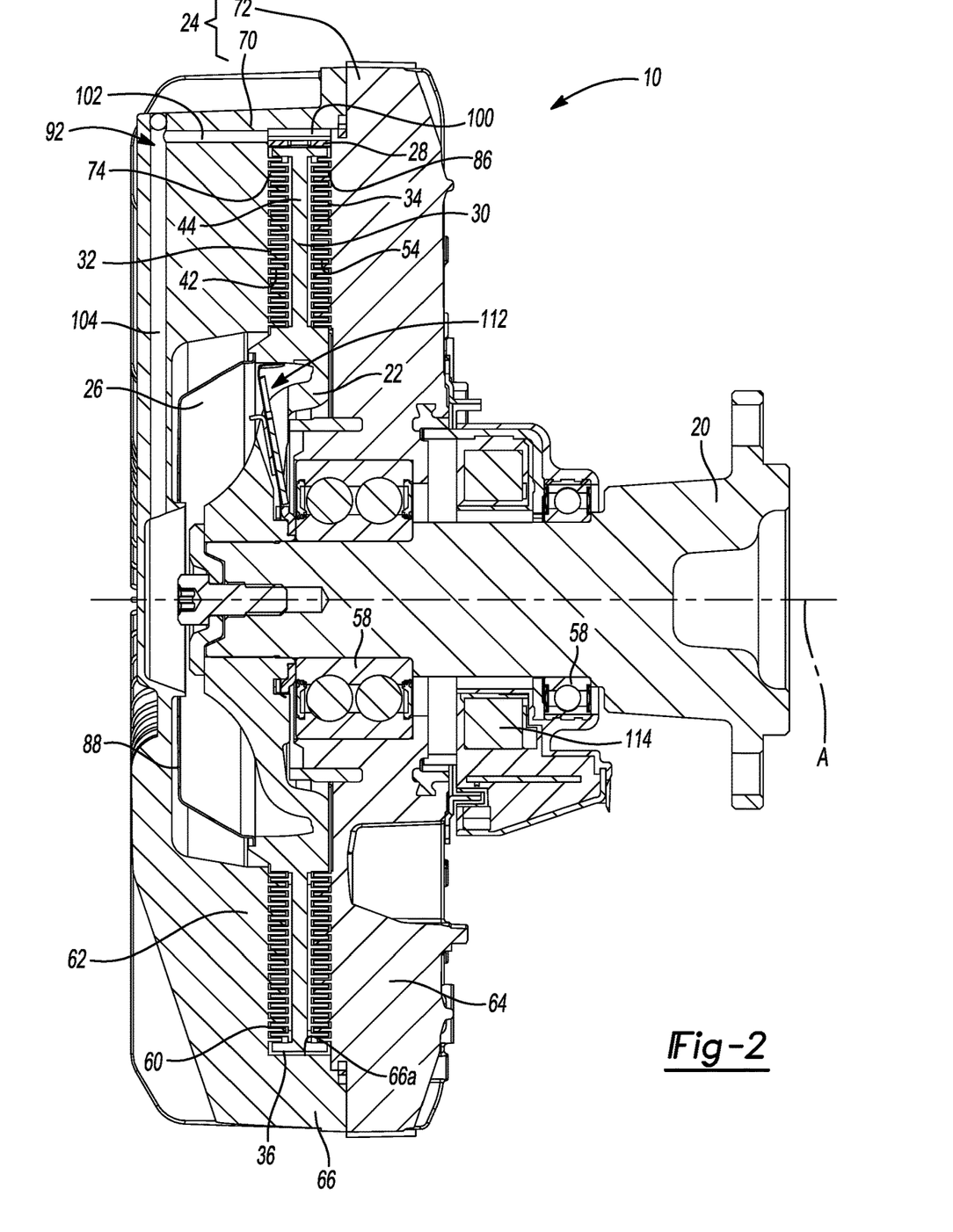
FIG. 2 is a cross-sectional view of the viscous fluid shear device of FIG. 1A.

With reference to FIGS. 1 and 2, an exemplary viscous fluid shear device constructed in accordance with the teachings of the present disclosure is generally indicated by reference numeral 10. The viscous fluid shear device 10 can be any type of device that employs a viscous fluid and relative rotation between two structures to transmit shear stresses through the viscous fluid. In the particular example provided, the viscous fluid shear device 10 is a viscous clutch of the type that is employed to transmit rotary power from an engine-driven input (not shown), such as a pulley, to an axial flow fan 14 to drive the axial flow fan 14 at a desired rotational speed. It will be appreciated, however, that the viscous fluid shear device 10 can be another type of device, including a heater or a pump. The viscous fluid shear device 10 can include a shaft 20, a rotor 22, a housing assembly 24, a reservoir 26, and a wiper 28.

The shaft 20 can serve as the input member of the viscous fluid shear device 10 and can be directly driven by a source of rotary power (e.g., the shaft 20 can be directly coupled to or unitarily formed with an output shaft of an electric motor) or can be coupled to a source of rotary power through an endless power transmission means. The endless power transmission means could comprise a belt (not shown), such as a V-belt or poly V-belt, that could be part of a conventional front engine accessory drive system (FEAD). The belt of the FEAD can be mounted on a plurality of pulleys (not shown), including a crankshaft pulley, which can be coupled to an engine crankshaft for rotation therewith, and an accessory pulley that can be mounted to the shaft 20 for common rotation. Alternatively, the endless power transmission means could comprise a chain and sprockets, or could comprise a plurality of meshing gears.

Figure 3:
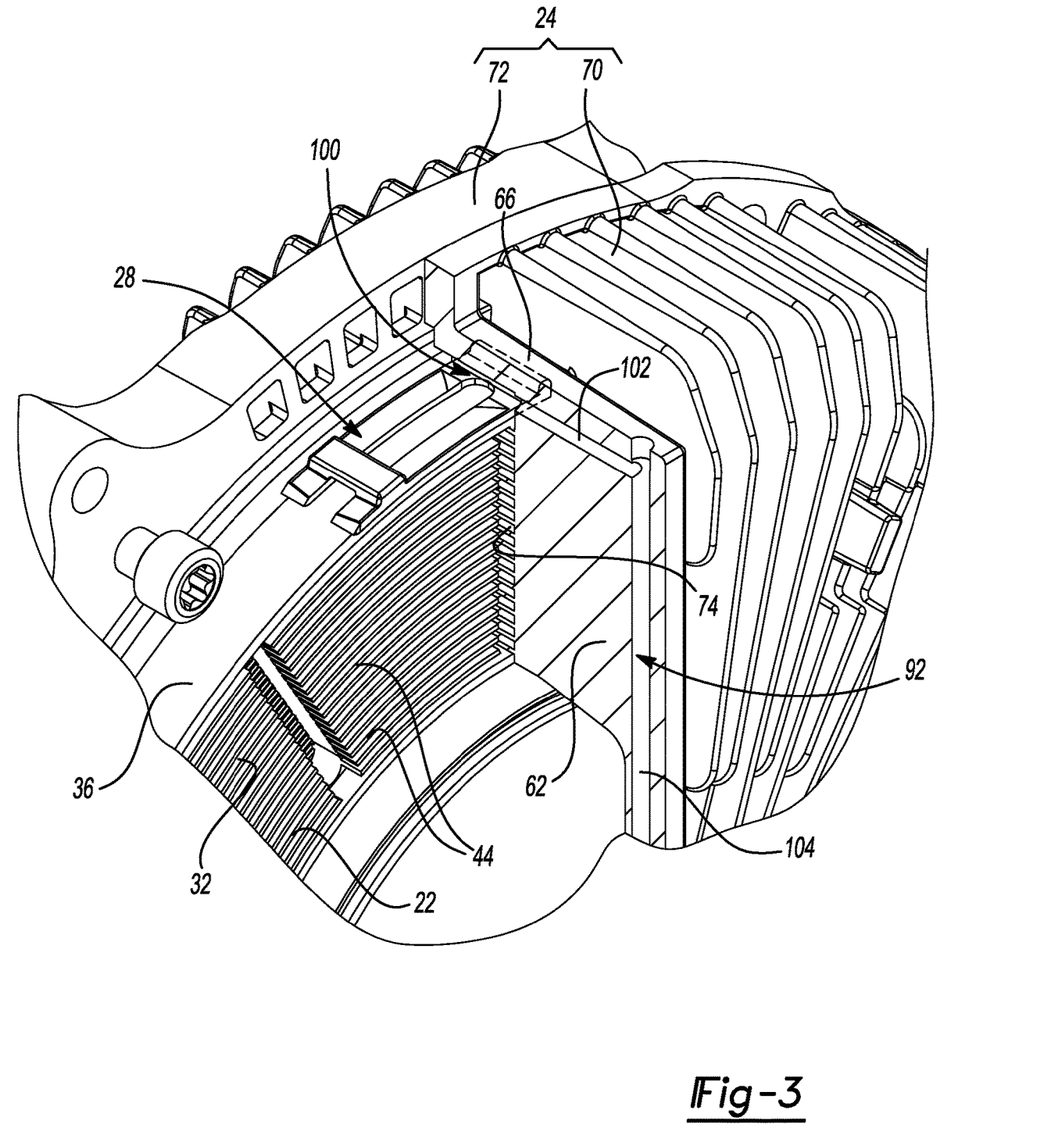
FIG. 3 is a perspective, partly sectioned view of the viscous fluid shear device of FIG. 1A.
Figure 4:
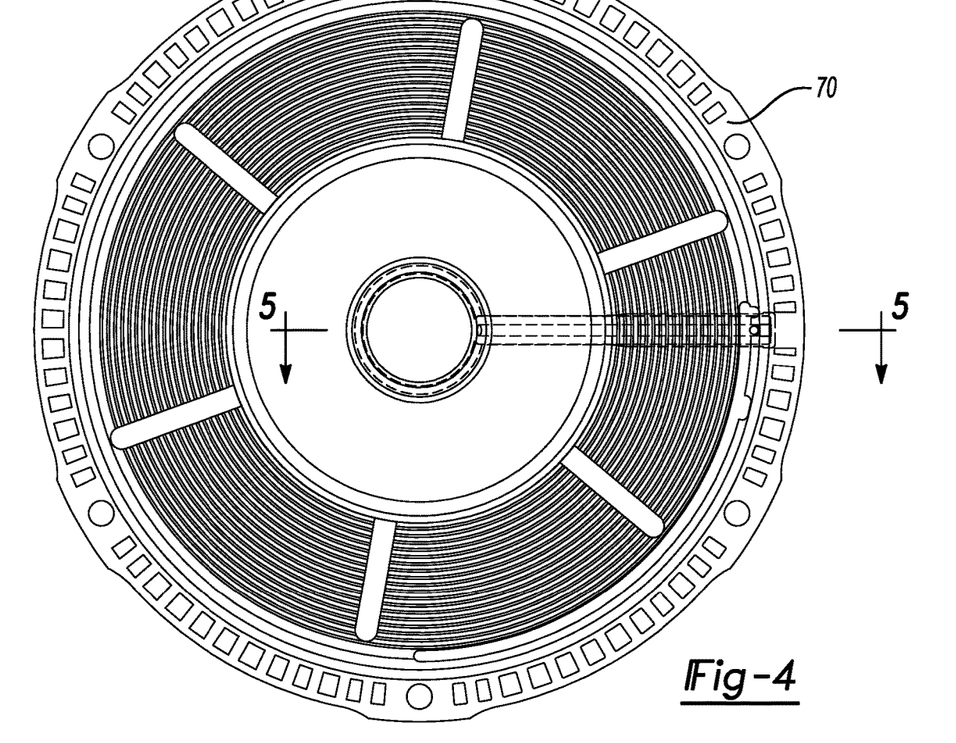
FIG. 4 is a rear elevation view of a portion of the viscous fluid shear device of FIG. 1A illustrating a first housing member in more detail.
Figure 5:
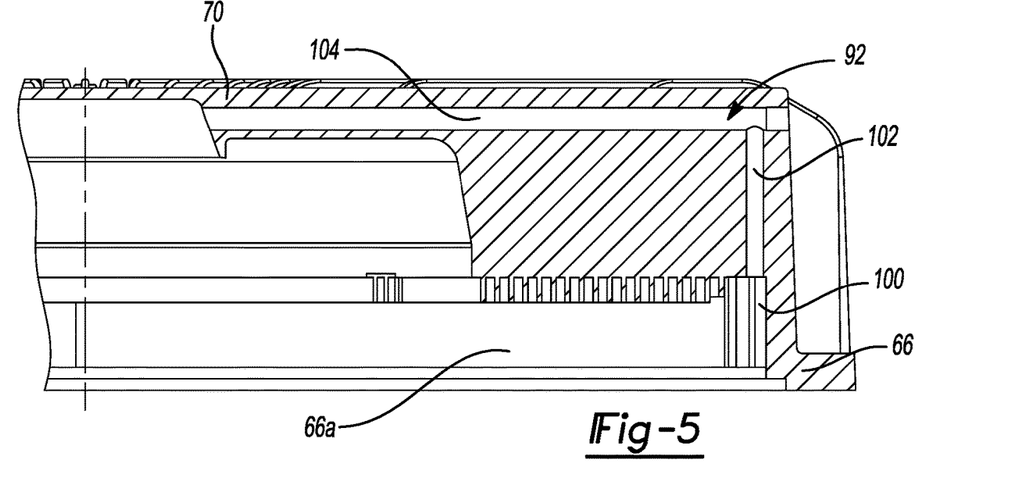
FIG. 5 is a section view taken along the line 5-5 of FIG. 4.

With reference to FIGS. 2 and 3, the rotor 22 can be mounted to the shaft 20 for rotation therewith. The rotor 22 can comprise a disk portion 30 that can have a first side 32, a second side 34 and an outer circumferential surface 36. The first side 32 can have a plurality of first concentric ribs 42 that are disposed concentrically about a rotational axis A of the shaft 20. In the example provided, each of the first concentric ribs 42 extends from an axial side of a body 44 of the disk portion 30 in a direction that is parallel to the rotational axis A. The second side 34 can have a plurality of second concentric ribs 54 that can be disposed concentrically about the rotational axis A. In the example provided, each of the second concentric ribs 54 extends from an opposite axial side of the body 44 of the disk portion 30 in a direction that is parallel to the rotational axis A. It will be appreciated that the configuration of the first concentric ribs 42 and/or the configuration of the second concentric ribs 54 could deviate from the particular configurations that are depicted herein. It will also be appreciated that the disk portion 30 could be formed with a single set of concentric ribs (i.e., the first concentric ribs 42 or the second concentric ribs 54).

The housing assembly 24 is the output member of the viscous fluid shear device 10 in the example provided and can be supported by one or more bearings 58 that are mounted on the shaft 20 so that the housing assembly 24 is rotatable about the rotational axis A independently of the rotor 22 and shaft 20. The housing assembly 24 can define a working cavity 60 that can be bounded by a first annular wall 62, a second annular wall 64 and a circumferentially extending wall 66 that is disposed between and connects the first and second annular walls 62 and 64. In the example illustrated, the housing assembly 24 comprises a first housing member 70 and a second housing member 72 that cooperate to form the working cavity 60. The first annular wall 62 can define a plurality of first concentric fluid grooves 74 that can be disposed concentrically about the rotational axis A. In the example provided, each of the first concentric fluid grooves 74 extends into the first housing member 70 in a direction that is parallel to the rotational axis A. The second annular wall 64 can define a plurality of second concentric fluid grooves 86 that can be disposed concentrically about the rotational axis A. In the example provided, each of the second concentric fluid grooves 86 extends into the second housing member 72 in a direction that is parallel to the rotational axis A. It will be appreciated that the configuration of the first concentric fluid grooves 74 and/or the configuration of the second concentric fluid grooves 86 could deviate from the particular configurations that are depicted herein.

The rotor 22 can be received in the housing assembly 24 such that the disk portion 30 is disposed in the working cavity 60. Each of the first concentric ribs 42 can be received in an associated one of the first concentric fluid grooves 74 and each of the second concentric ribs 54 can be received in an associated one of the second concentric fluid grooves 86.

With reference to FIG. 2, the reservoir 26 is configured to hold a viscous fluid, such as a silicone fluid, and can be disposed in any desired location. For example, the reservoir 26 could be housed externally of the housing assembly 24. In the particular example provided, the reservoir 26 is received in the housing assembly 24 and includes a reservoir cover 88 that is coupled to the rotor 22 for rotation therewith. Alternatively, the reservoir 26 could be coupled to the housing assembly 24 for rotation therewith. The reservoir 26 can be fluidly coupled to the working cavity 60 via a supply passage (not specifically shown) and a scavenge passage 92. The supply passage is configured to communicate viscous fluid in the reservoir 26 to an input side of the working cavity 60 and in the particular example provided, is formed in the rotor 22.

With reference to FIGS. 2, 3, 5 and 6, the scavenge passage 92 can be configured to communicate viscous fluid discharged from the working cavity 60 to the reservoir 26. In the particular example provided, the scavenge passage 92 includes a scavenge input 100, a first conduit portion 102 and a second conduit portion 104. The scavenge input 100 can be a counterbore that is formed in an axial end of the first housing member 70 that faces the second housing member 72. The scavenge input 100 can intersect a radially inward surface 66a of the circumferentially extending wall 66 to thereby fluidly communicate with the portion of the working cavity 60 that is disposed radially outwardly of the outer circumferential surface 36 of the rotor 22. The first conduit portion 102 can extend into the first housing member 70 and can intersect the scavenge input 100. In the example provided, the scavenge input 100 and the first conduit portion 102 are formed via a step drill such that the scavenge input 100 and the first conduit portion 102 are concentric and disposed along a centerline or axis that is parallel to the rotational axis A. It will be appreciated, however, that the first conduit portion 102 could intersect the scavenge input 100 in a non-concentric manner and/or that the first conduit portion 102 could be disposed about an axis that is not parallel with the rotational axis A and/or the axis of the scavenge input 100. The second conduit portion 104 can intersect the first conduit portion 102 and can extend radially inwardly toward the reservoir 26. In the example provided, the second conduit portion 104 is disposed about an axis that is perpendicular to and which intersects the rotational axis A, but it will be appreciated that the second conduit portion 104 could be formed in whole or in part along an axis that is oblique or skewed to the rotational axis A.

If desired, one or more valves 112 can be employed to control fluid communication between the reservoir 26 and the working cavity 60. The valve 112 can include a valve member (not specifically shown), which is coupled to the rotor 22 for rotation therewith, and an actuator 114 that is configured to move the valve member. The actuator 114 can be configured in any desired manner, such as with a bimetallic element, or a fluid-powered cylinder, for example but in the particular example provided, the actuator 114 comprises an electromagnet.

Figures 6, 7, 8:
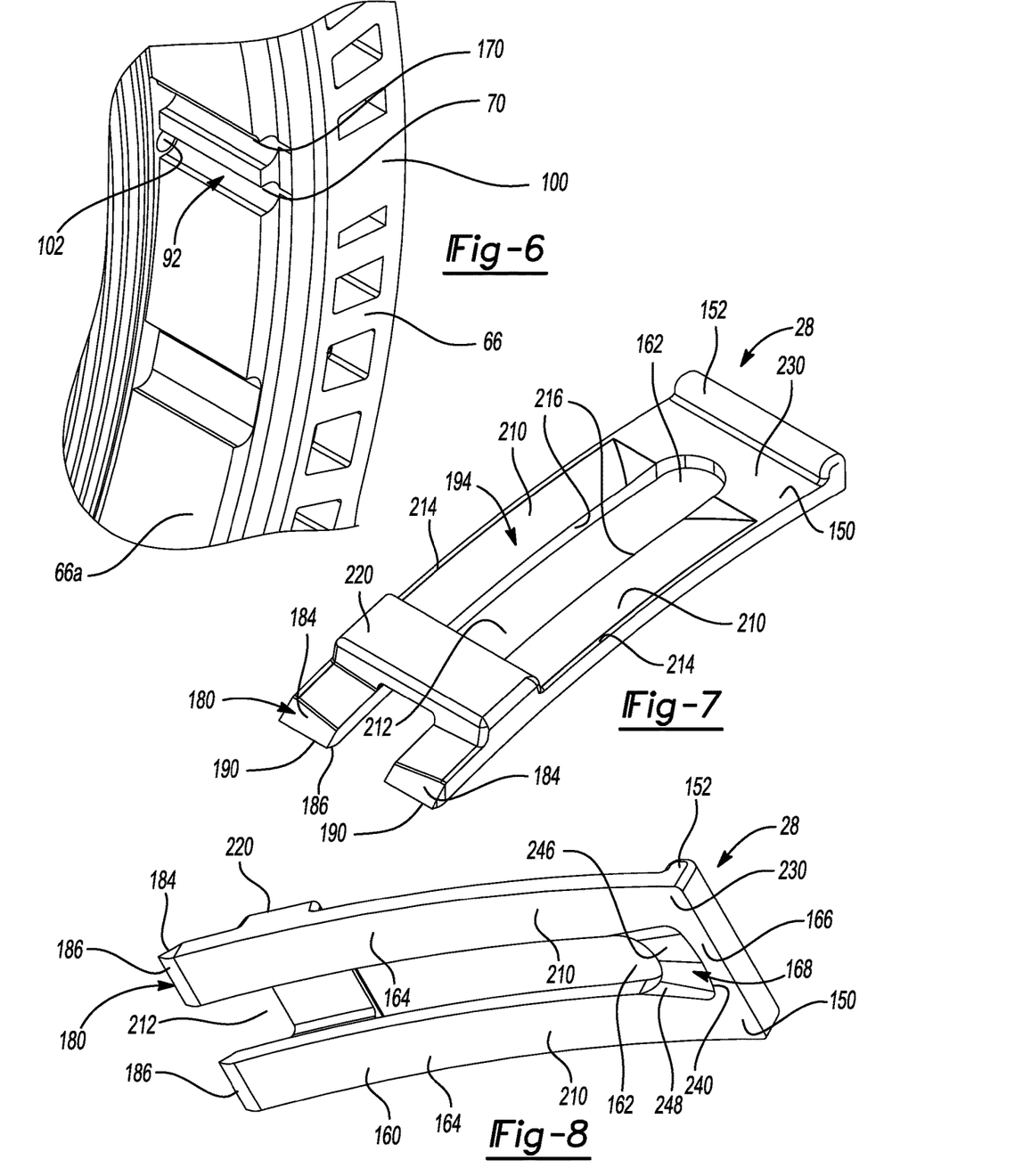
FIG. 6 is a perspective view of a portion of the first housing member illustrating a scavenge passage formed in a circumferentially extending wall of the first housing member.
FIG. 7 is a perspective view of a portion of the viscous fluid shear device of FIG. 1A illustrating an outer circumferential side of a wiper.
FIG. 8 is a perspective view illustrating an inner circumferential side of the wiper.

With reference to FIGS. 7 and 8, the wiper 28 that can be unitarily and integrally formed of a suitable material, such as a high temperature plastic (e.g., high temperature thermoset plastic), and can have a wiper body 150 and a tang 152 that is coupled to the wiper body 150. The wiper body 150 can extend in a generally circumferential direction. A radially inner surface 160 of the wiper body 150 can be shaped as a segment of a surface of a right cylinder having a constant radius. The wiper body 150 can define a fluid outlet aperture 162, a pair of lateral seal surfaces 164, a trailing seal surface 166 and one or more fluid channels 168.

Figure 9:
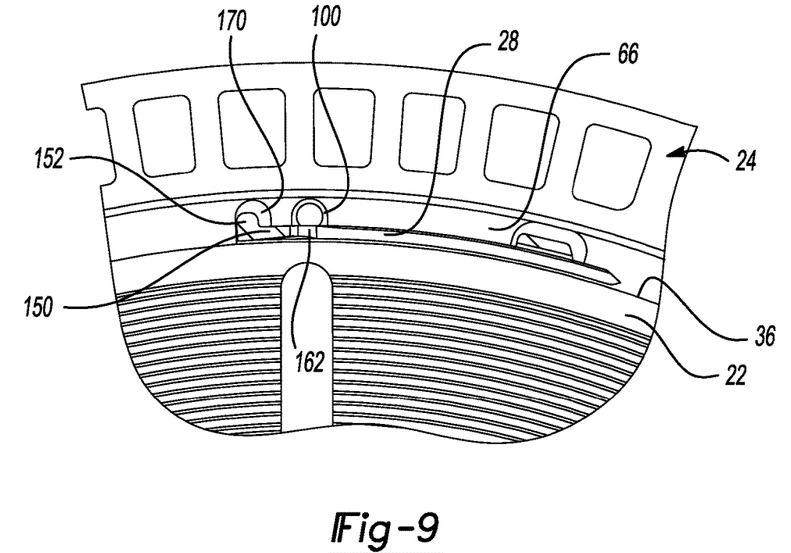
FIG. 9 is a rear elevation view of a portion of the first housing member with a section of the wiper received therein.
Figure 10:
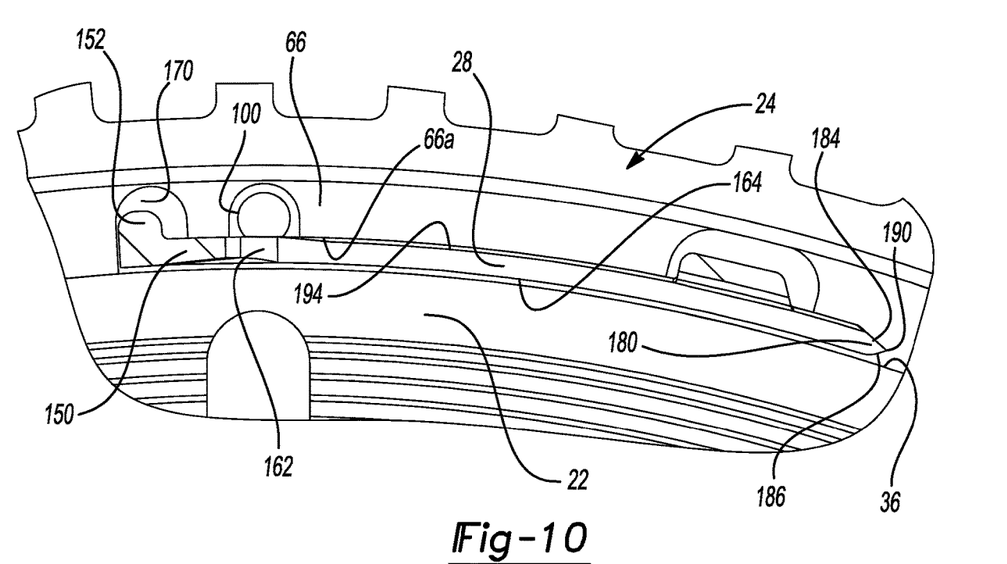
FIG. 10 is an enlarged portion of FIG. 9.

With reference to FIGS. 7 through 10, the tang 152 can project radially outwardly from the wiper body 150 and can be received into a radially extending notch 170 (FIGS. 9 & 10) that is formed into the circumferentially extending wall 66 (FIGS. 9 & 10). The tang 152 and the notch 170 (FIGS. 9 & 10) cooperate to movably couple the wiper 28 to the housing assembly 24 (FIGS. 9 & 10) in a way that a) inhibits rotation of the wiper 28 about the rotational axis A (FIG. 2) relative to the housing assembly 24 (FIGS. 9 & 10), b) permits the wiper 28 to move along the axis of the notch 170 (FIGS. 9 & 10) radially inwardly toward and away from the outer circumferential surface 36 (FIGS. 9 & 10) of the rotor 22 (FIGS. 9 & 10), c) pivot about the tang 152 relative to the notch 170 (FIGS. 9 & 10), and d) aligns the fluid outlet aperture 162 in the wiper body 150 to the scavenge input 100 (FIGS. 9 & 10) in the housing assembly 24 (FIGS. 9 & 10). In this regard, the wiper 28 is permitted to "float" or move relative to the housing assembly 24 (FIGS. 9 & 10) and the rotor 22 (FIGS. 9 & 10).

The fluid outlet aperture 162 can be a hole that is formed through the wiper body 150 that is configured to direct viscous fluid into the scavenge input 100. Each of the lateral seal surfaces 164 is configured to substantially conform to the outer circumferential surface 36 of the rotor 22, is spaced (laterally) apart from the other along the rotational axis A (FIG. 2) on opposite lateral sides of the fluid outlet aperture 162, and can include a tip portion 180 that can be contoured in a desired manner to aid in skimming a film of viscous fluid that clings to the outer circumferential surface 36 of the rotor 22 as the rotor 22 rotates about the rotational axis A (FIG. 2).

In the particular example provided, each of the tip portions 180 is shaped as a wedge or ramp having a first tapered surface 184, which is disposed on a surface of the tip portion 180 opposite the outer circumferential surface 36 of the rotor 22, and a second tapered surface 186 that is disposed on a surface of the tip portion 180 adjacent the outer circumferential surface 36 of the rotor 22. The first and second tapered surfaces 184 and 186 cooperate to form a knife edge 190 that "cuts" into the film of viscous fluid that clings to the outer circumferential surface 36 as the rotor 22 rotates.

Figure 11:
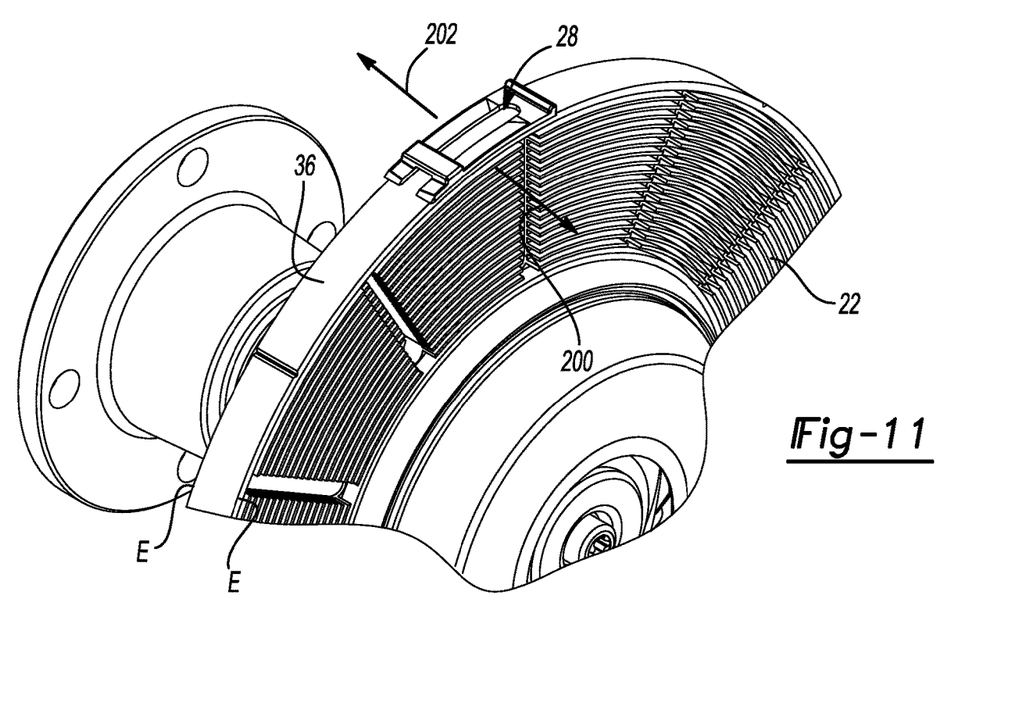
FIG. 11 is a perspective view of a portion of the viscous fluid shear device of FIG. 1A illustrating the wiper against a circumferentially extending surface of a rotor.

The first and second tapered surfaces 184 and 186 are sized and shaped such that a relatively small portion of the viscous fluid clinging to the outer circumferential surface 36 that is contacted by the tip portions 180 is directed between the lateral seal surfaces 164 and the outer circumferential surface 36. At least a portion of the viscous fluid that contacts the tip portions 180 but which is not directed between the lateral seal surfaces 164 and the outer circumferential surface 36 is directed over the portion of the radially outer surface 194 of the wiper body 150 corresponding to the tip portions 180 (i.e., the portion of the radially outer surface 194 between the knife edge 190 and a cross-bar 220). Configuration in this manner employs the "cutting" action of each of the tip portions 180 to generate a force that urges an associated one of the lateral seal surfaces 164 toward the outer circumferential surface 36. The relatively small space between the lateral seal surfaces 164 and the outer circumferential surface 36, along with the presence of the small film of the viscous fluid in this location, essentially creates a seal between each of the lateral seal surfaces 164 and the outer circumferential surface 36 that resists the migration of viscous fluid that is collected between the lateral seal surfaces 164 in the laterally outward directions that are indicated by arrows 200 and 202 (FIG. 11).

In the particular example provided, the wiper body 150 defines a pair of arms 210 and the slotted aperture 212. Each of the arms 210 defines an associated one of the lateral seal surfaces 164, while the slotted aperture 212 is disposed between the arms 210 and intersects the fluid outlet aperture 162. The portion of the radially outer surface 194 of the wiper body 150 that is defined by the arms 210 can taper between a laterally outward edge 214 of the arm 210 and a laterally inward edge 216 of the arm 210. Optionally, the wiper body 150 could include one or more of the cross-bars 220; the cross-bars 220 can fixedly couple the arms 210 to one another to inhibit the lateral separation or spreading of the arms 210 from one another.

The trailing seal surface 166 can be fixedly coupled to the lateral seal surfaces 164 and can extend in a circumferential direction from the fluid outlet aperture 162. The small film of viscous fluid between the lateral seal surfaces 164 and the outer circumferential surface 36 of the rotor 22 migrates to the trailing seal surface 166 as the rotor 22 rotates about the rotational axis A (FIG. 2). The presence of the migrated viscous fluid in the relatively small space between the trailing seal surface 166 and the outer circumferential surface 36 essentially creates a seal between a trailing portion of the wiper body 150 (i.e., the portion of the wiper body 150 that circumferentially trails the fluid outlet aperture 162) and the outer circumferential surface 36 so that the viscous fluid that is driven into the fluid outlet aperture 162 during rotation of the rotor 22 relative to the housing assembly 24 is directed into the scavenge input 100. It will also be appreciated that viscous fluid that flows over the radially outer surface 194 of the wiper body 150 that does not flow into the scavenge input 100 can collect against the tang 152. The spacing between the tang 152 and the circumferentially extending wall 66 is such that the viscous fluid that collects against the tang 152 has a difficult time working its way around the tang 152. Consequently, the viscous fluid in this region helps to generate a force that is exerted onto a heel 230 of the wiper body 150 (i.e., the portion of the wiper body 150 that is disposed circumferentially past the fluid outlet aperture 162) that helps to maintain or form the "seal"

between the trailing seal surface 166 of the wiper body 150 and the outer circumferential surface 36.

Each of the fluid channels 168 can be formed in one or more of the lateral seal surfaces 164 and the trailing seal surface 166. Each of the fluid channels 168 is configured to direct viscous fluid toward the outer circumferential surface 36 in a way that produces a localized high pressure field that results in radially-outwardly directed force on the wiper body 150 that urges the wiper body 150 away from the outer circumferential surface 36 of the rotor 22. The radially outwardly directed force that is generated by the fluid channel(s) 168 during operation of the viscous fluid shear device 10 (FIG. 2) can be specifically designed to mostly but not completely cancel out the radially inwardly directed force that is generated by the viscous fluid that acts on the wiper body 150. It will be appreciated that the radially outwardly directed force that is generated by the fluid channel(s) 168 during operation of the viscous fluid shear device 10 (FIG. 2) can be balanced with (i.e., equal to) a net radially inwardly directed force (produced by the shearing of the viscous fluid by the tip portions 180 as the rotor 22 rotates) that acts on the wiper body 150 so that a thickness of the film of viscous fluid that is disposed between the lateral seal surfaces 164 and the outer circumferential surface 36 can be sized to a desired thickness.

In the example of FIG. 8, the fluid channel 168 is formed into the trailing seal surface 166 and emanates from (i.e., intersects) the fluid outlet aperture 162 in the wiper body 150, extending both circumferentially and laterally outwardly therefrom. The fluid channel 168 is deepest where the fluid channel 168 intersects the fluid outlet aperture 162. At least a trailing portion of the fluid channel 168 is contoured to extend toward the trailing seal surface 166 with decreasing distance to the trailing end 240 of the fluid channel 168. The exact configuration of the fluid channel 168 is dependent upon various factors, including the desired magnitude and location of the radially outwardly directed force that is generated by fluid in the fluid channel 168 as the rotor 22 rotates relative to the housing assembly 24, as well as the desired area over which the radially outwardly directed force acts. In the particular example provided, the fluid channel 168 is symmetric about the lateral centerline of the wiper body 150, with each lateral half of the fluid channel 168 being defined by a pair of curved surfaces that form a portion of a radially outer surface 246 and one of the lateral surfaces 248 of the fluid channel 168, respectively. We have obtained good results in our computational fluid dynamics-based analyses when: a) the fluid channel 168 was sized about less than or equal to 6 mm in overall length, and preferably less than or equal to 4 mm in overall length, b) was positioned at least 1.5 mm away from a lateral edge E (FIG. 11) of the outer circumferential surface 36 of the rotor 22, c) had a maximum depth greater than or equal to 0.15 mm and less than or equal to 2.0 mm, preferably greater than or equal to 0.2 mm and less than or equal to 0.5 mm, and more preferably equal to 0.3 mm, and d) terminated such that the trailing end of the fluid channel 168 was spaced circumferentially apart from a trailing end of the wiper body 150 by at least 2 mm. Preferably, the fluid channel 168 does not extend laterally past the outer circumferential surface 36 on the rotor 22.

Generally speaking, the fluid channel 168 can have a first or leading portion (disposed adjacent to the edge of the fluid outlet aperture 168 in the example provided), which can be formed with a first cross-sectional area, and a second or trailing portion (i.e., the trailing portion disposed adjacent to the trailing end of the fluid outlet aperture 168 in the example provided) that can be formed with a second, smaller cross-sectional area. Each of the first and second cross-sectional areas can be defined by first and second planes, respectively, that can extend through the rotational axis A (FIG. 2). The second plane can be spaced circumferentially apart from the first plane in a predetermined rotational direction. The fluid channel 168 can have an open end that can be in fluid communication with a source of pressurized viscous fluid, such as the fluid outlet aperture 162 or the tip portions 180 of the wiper body 150. If multiple fluid channels 168 are employed, the fluid channels 168 could optionally be coupled in fluid communication with one another (e.g., to initiate at a common location and/or to terminate at a common location).

During the operation of the viscous fluid shear device 10 (FIG. 1), a portion of the viscous fluid that enters the fluid outlet aperture 162 flows into the leading end of the fluid channel 168. The pressure of the viscous fluid in the fluid channel 168 increases as the depth/cross-sectional area of the fluid channel 168 decreases from its maximum value, thereby exerting a radially outwardly directed force to the heel 230 of the wiper body 150. In this regard, the fluid channel 168 functions as a "shearing nozzle". The radially outwardly directed force on the heel 230 of the wiper body 150 cancels out a portion of the force on the wiper body 150 that is exerted against the radially outer surface 194 of the wiper body 150 by the viscous fluid between the radially outer surface 194 of the wiper body 150 and the circumferentially extending surface 66a of the circumferentially extending wall 66.

Figure 12:
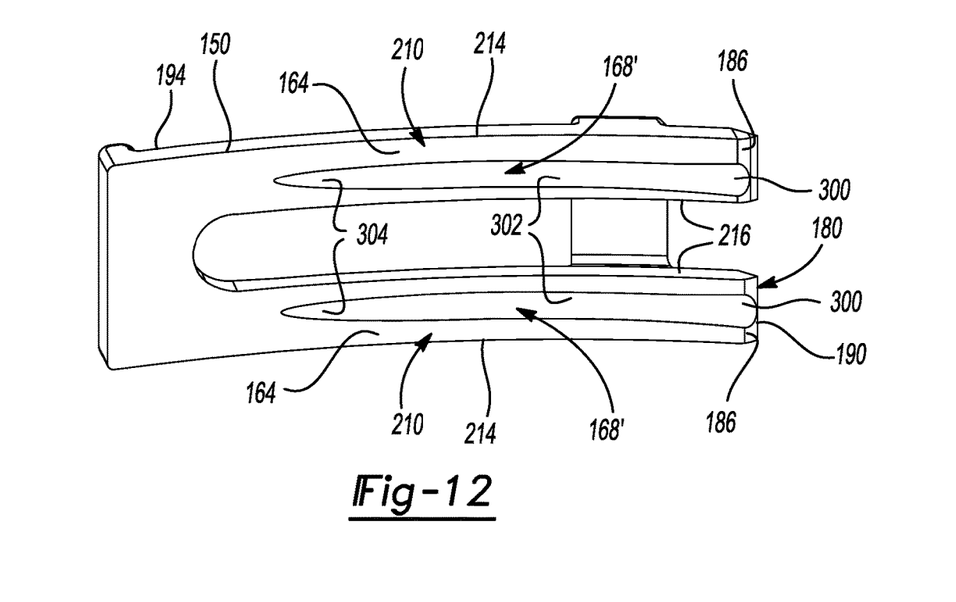
FIG. 12 is a perspective view of an inner circumferential side of an alternately constructed wiper.

Additionally or alternatively, one or more of the fluid channels could be formed into one or more of the lateral seal surfaces 164 as is shown in FIG. 12. In the example provided, a seal surface fluid channel 168' is formed into each of the lateral seal surfaces 164. Each of the fluid channels 168' can be disposed at location that is located relatively closer to the laterally inward edge 216 of the arm 210 than the laterally outward edge 214 of the arm 210. In the example provided, each of the fluid channels 168' has a first channel portion 300, a second channel portion 302 and a third channel portion 304. The first channel portion 300 can intersect the second tapered surface 186 on an associated one of the tip portions 180. Optionally, the cross-sectional area or width of the first channel portion 300 can increase with decreasing distance to the knife edge 190. A leading end of the second channel portion 302 can be fluidly coupled to the trailing end of the first channel portion 300. The second channel portion 302 can have a substantially constant depth and cross-sectional area. A leading end of the third channel portion 304 can be fluidly coupled to the trailing end of the second channel portion 302. The third channel portion 304 can be formed with a cross-sectional area that is smaller than the cross-sectional area of the second channel portion 302. In the particular example provided, the third channel portion 304 decreases with increasing distance from the trailing end of the second channel portion 302. Accordingly, it will be appreciated that cross-sectional areas through the second and third channel portions 302 and 304 are defined by first and second planes, respectively, that extend through the rotational axis A (FIG. 2) and that the second plane is spaced circumferentially apart from the first plane in the predetermined rotational direction.

During operation of the viscous fluid shear device 10 (FIG. 1), viscous fluid that clings to the outer circumferential surface 36 (FIG. 11) of the rotor 22 (FIG. 11) contacts the tip portions 180 of the wiper body 150, causing some of the viscous fluid to pass over the radially outer surface 194 of the wiper body 150, another portion to pass between the lateral seal surfaces 164 and the outer circumferential surface 36 (FIG. 11) of the rotor 22 (FIG. 11), and another portion to flow into the first channel portion 300 of each of the fluid channels 168'. Further rotation of the rotor 22 (FIG. 11) relative to the housing assembly 24 (FIG. 2) generates shear forces in the viscous fluid in the fluid channels 168' that pulls the viscous fluid through the fluid channels 168' such that the viscous fluid therein is discharged from the third channel portions 304. Due to the change in the cross-sectional area from the second channel portions 302 to the third channel portions 304, the pressure of the viscous fluid in the third channel portions 304 increases (relative to the pressure of the viscous fluid in the second channel portions 302) before it is discharged from the third channel portions 304. In this regard, the fluid channels 168' function as shearing nozzles. The increased pressure of the viscous fluid in the third channel portions 304 exerts a radially outwardly directed force on the wiper body 150 that cancels out a portion of the force on the wiper body 150 that is exerted against the radially outer surface 194 of the wiper body 150 by the viscous fluid between the radially outer surface 194 of the wiper body 150 and the outer circumferential surface 66a (FIG. 2) of the circumferentially extending wall 66.

Figure 13:
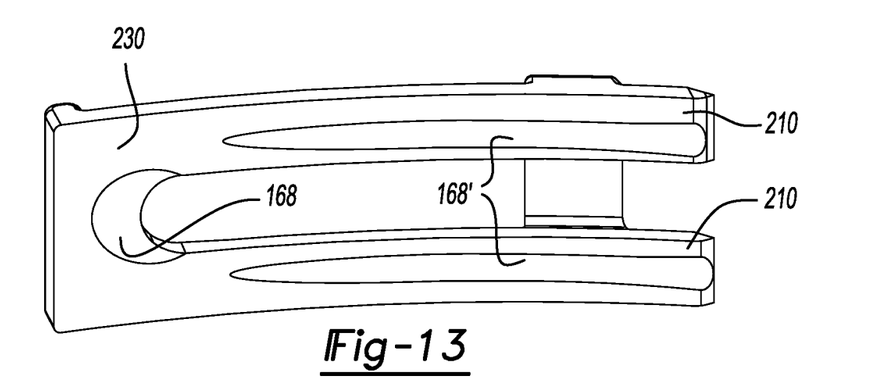
FIG. 13 is a perspective view of an inner circumferential side of another alternately constructed wiper; and"

In the example of FIG. 13, a fluid channel 168 is formed in the heel 230 and fluid channels 168' are formed in the arms 210.

Figure 14A:
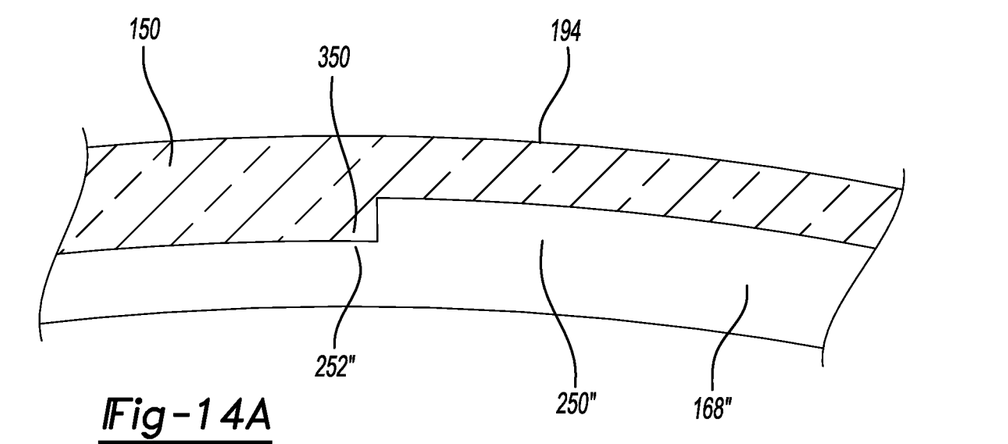
FIGS. 14A and 14B are section view of portions of other alternately constructed wipers.
Figure 14B:
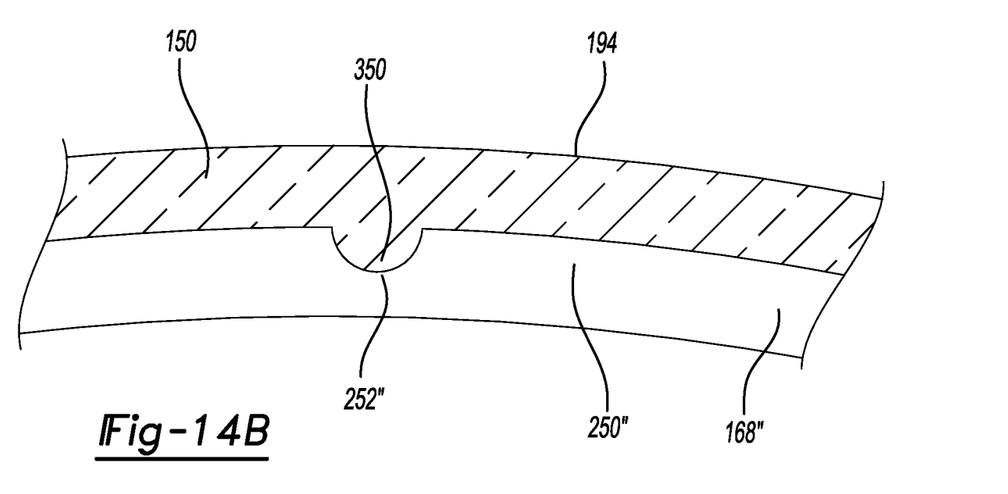

While the fluid channels 168 and 168' of FIGS. 8, 12 and 13 have been illustrated and described as being formed with a trailing portion whose cross-sectional area diminishes with decreasing distance toward a trailing end of the wiper body 150, it will be appreciated that the fluid channel(s) could be formed with one or more discontinuities (e.g., steps) as shown in FIGS. 14A and 14B to achieve a desired reduction in cross-sectional area and an associated increase in the pressure of the viscous fluid in the fluid channel 168". In these examples, the first portion 250" is formed with a first cross-sectional area, and a second portion 252" is formed with a second, smaller cross-sectional area. A step or ledge 350 formed in the fluid channel 168" forms the smaller cross-sectional area of the second portion 252".

From the foregoing, it will be appreciated that one or more fluid channels can be formed in the radially inner surface of the wiper body to generate associated fluid-based forces that act on the radially inner surface of the wiper body to partly cancel out or counteract the radially inwardly directed force that is exerted on the radially outer surface of the wiper body by the viscous fluid that is disposed on the radially outer surface of the wiper body. The flow channels can be configured in a desired manner not only to produce counteracting forces of desired magnitudes, but also to locate the counteracting forces at desired locations. Through the careful sizing and placement of the one or more flow channels, the net force acting on the wiper to urge the wiper body against the circumferentially extending surface of the rotor can be lowered (relative to a configuration that does not utilize flow channels) so that wear on the radially inner surface of the wiper body due to contact with the circumferentially extending surface of the rotor can be reduced. In our computational fluid dynamics-based analyses, we were able to reduce contact forces between the wiper 28 and the outer circumferential surface 36 on the rotor 22 by fifty to seventy-five percent without adversely affecting the static pressure produced by the pumping mechanism (i.e., the housing assembly 24, the rotor 22 and the wiper 28) to any significant degree.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A viscous fluid shear device comprising:
a housing assembly having a plurality of first ribs, which are disposed concentrically about a central axis, and a scavenge conduit;
a rotor received in the housing assembly, the rotor being rotatable relative to the housing assembly about the central axis in a predetermined rotational direction, the rotor defining a plurality of second ribs, the rotor cooperating with the housing assembly to define a working cavity in which the first and second ribs are received;
a reservoir; and
a wiper movably mounted to the housing assembly, the wiper being adapted to wipe a viscous fluid from a circumferentially extending surface on the rotor;
wherein the scavenge conduit fluidly couples the working cavity to the reservoir; and
wherein the wiper defines at least one fluid channel on a surface of the wiper that faces the circumferentially extending surface on the rotor, the at least one fluid channel having a first portion and a second portion, the first portion being formed with a first cross-sectional area, the second portion being formed with a second, smaller cross-sectional area, each of the first and second cross-sectional areas being defined by first and second planes, respectively, that extend through the central axis, the second plane being spaced circumferentially apart from the first plane in the predetermined rotational direction.

2. The viscous fluid shear device of claim 1, wherein the surface of the wiper that faces the circumferentially extending surface on the rotor has a pair of lateral seal surfaces that are spaced axially apart from one another along the central axis.

3. The viscous fluid shear device of claim 2, wherein the at least one fluid channel comprises a pair of seal surface fluid channels, each of the seal surface fluid channels being formed in an associated one of the lateral seal surfaces.

4. The viscous fluid shear device of claim 3, wherein a fluid outlet aperture is formed in the wiper, the fluid outlet aperture being disposed between the lateral seal surfaces and being in fluid communication with the scavenge passage.

5. The viscous fluid shear device of claim 4, wherein the first portion of each of the seal surface fluid channels is formed with a constant depth.

6. The viscous shear device of claim 4, wherein each of the seal surface fluid channels further comprise a third portion that is disposed on a side of the first portion opposite the second portion, wherein each of the third portions has a cross-sectional area that increases with increasing distance from an associated one of the first portions.

7. The viscous shear device of claim 4, wherein each of the seal surface fluid channels is positioned closer to an inboard edge of an associated one of the lateral seal surfaces than an outboard edge of the associated one of the lateral seal surfaces.

8. The viscous fluid shear device of claim 2, wherein a fluid outlet aperture is formed in the wiper, the fluid outlet aperture being disposed between the lateral seal surfaces and being in fluid communication with the scavenge passage, and wherein the at least one fluid channel intersects the fluid outlet aperture.

9. The viscous fluid shear device of claim 8, wherein the at least one fluid channel has a length that is less than or equal to 6 mm.

10. The viscous fluid shear device of claim 8, wherein the at least one fluid channel terminates without intersecting a trailing edge of the wiper.

11. The viscous fluid shear device of claim 1, wherein the first portion has a depth that is greater than or equal to 0.1 mm and less than or equal to 2.0 mm.

12. The viscous fluid shear device of claim 11, wherein the depth is greater than or equal to 0.2 mm and less than or equal to 0.5 mm.

13. A viscous fluid shear device comprising:
a housing assembly having a plurality of first ribs, which are disposed concentrically about a central axis, and a scavenge conduit;
a rotor received in the housing assembly, the rotor being rotatable relative to the housing assembly about the central axis in a predetermined rotational direction, the rotor defining a plurality of second ribs, the rotor cooperating with the housing assembly to define a working cavity in which the first and second ribs are received;
a reservoir; and
a wiper movably mounted to the housing assembly, the wiper being adapted to wipe a viscous fluid from a circumferentially extending surface on the rotor;
wherein the scavenge conduit fluidly couples the working cavity to the reservoir; and
wherein the wiper defines at least one fluid channel on a surface of the wiper that faces the circumferentially extending surface on the rotor, the at least one fluid channel having a first portion and a second portion, the first portion being configured with a maximum depth as measured from the surface of the wiper that faces the circumferentially extending surface of the rotor, and wherein at one or more locations a depth of the second portion as measured from the surface of the wiper that faces the circumferentially extending surface of the rotor is smaller than the maximum depth of the first portion.

14. The viscous fluid shear device of claim 13, wherein the surface of the wiper that faces the circumferentially extending surface on the rotor has a pair of lateral seal surfaces that are spaced axially apart from one another along the central axis.

15. The viscous fluid shear device of claim 14, wherein the at least one fluid channel comprises a pair of seal surface fluid channels, each of the seal surface fluid channels being formed in an associated one of the lateral seal surfaces.

16. The viscous fluid shear device of claim 15, wherein a fluid outlet aperture is formed in the wiper, the fluid outlet aperture being disposed between the lateral seal surfaces and being in fluid communication with the scavenge passage, and wherein the fluid outlet aperture is spaced circumferentially apart from the seal surface fluid channels.

17. The viscous fluid shear device of claim 16, wherein the first portion of each of the seal surface fluid channels is formed with a constant depth.

18. The viscous fluid shear device of claim 16, wherein each of the seal surface fluid channels further comprise a third portion that is disposed on a side of the first portion opposite the second portion, wherein each of the third portions has a cross-sectional area that increases with increasing distance from an associated one of the first portions.

19. The viscous shear device of claim 16, wherein each of the seal surface fluid channels is positioned closer to an inboard edge of an associated one of the lateral seal surfaces than an outboard edge of the associated one of the lateral seal surfaces.

20. The viscous fluid shear device of claim 14, wherein a fluid outlet aperture is formed in the wiper, the fluid outlet aperture being disposed between the lateral seal surfaces and being in fluid communication with the scavenge passage, and wherein the at least one fluid channel intersects the fluid outlet aperture.

21. The viscous fluid shear device of claim 20, wherein the at least one fluid channel has a length that is less than or equal to 5.0 mm.

22. The viscous fluid shear device of claim 20, wherein the at least one fluid channel terminates without intersecting a trailing edge of the wiper.

23. The viscous fluid shear device of claim 13, wherein the first portion has a depth that is greater than or equal to 0.1 mm and less than or equal to 2.0 mm.

24. The viscous fluid shear device of claim 23, wherein the depth is greater than or equal to 0.2 mm and less than or equal to 0.5 mm.

25. A viscous fluid shear device comprising:
a housing assembly having a plurality of first ribs, which are disposed concentrically about a central axis, and a scavenge conduit;
a rotor received in the housing assembly, the rotor being rotatable relative to the housing assembly about the central axis in a predetermined rotational direction, the rotor defining a plurality of second ribs, the rotor cooperating with the housing assembly to define a working cavity in which the first and second ribs are received;
a reservoir;
a wiper movably mounted to the housing assembly, the wiper being adapted to direct a viscous fluid from a circumferentially extending surface on the rotor; and
means for generating a localized high pressure field in a fluid that is disposed radially between the wiper and the circumferentially extending surface on the rotor;
wherein the scavenge conduit fluidly couples the working cavity to the reservoir.

* * * * *